May 31, 1960     R. L. WATSON     2,938,295

FISHHOOK ASSEMBLY

Filed July 5, 1957

INVENTOR.
ROGER L. WATSON,
BY
McMorrow, Berman & Davidson
ATTORNEYS.

United States Patent Office 2,938,295
Patented May 31, 1960

2,938,295
FISHHOOK ASSEMBLY
Roger L. Watson, 24 Jewel St., Gorham, N.H.
Filed July 5, 1957, Ser. No. 669,998
1 Claim. (Cl. 43—43.2)

The present invention relates to a fishhook assembly having a demountable weed guard.

An object of the present invention is to provide a fishhook assembly having a weed guard which is readily attached to and detached from the shank of the fishhook.

Another object of the present invention is to provide a fishhook assembly which lends itself to fishing in weeded areas without danger of entanglement of the hook of the fishhook in the weeds, one which enables the user thereof to bait the hook before attachment of the weed guard, one which is sturdy in construction and of simple structure, one economical to manufacture and assemble, and one which is highly effective in action.

Figure 1:
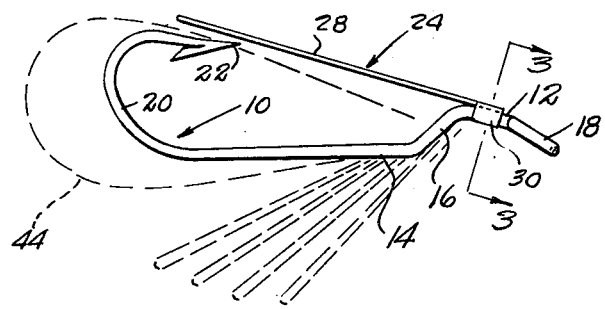
Figure 2:
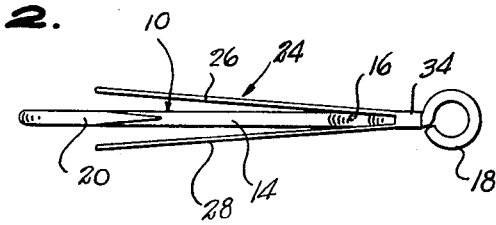
Figure 3:
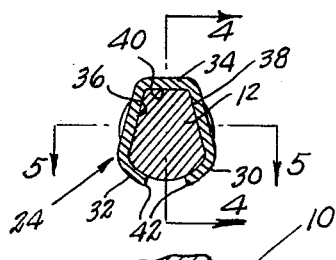
Figure 4:
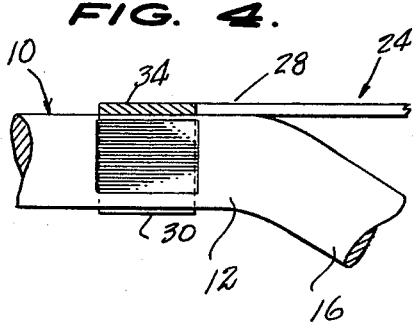
Figure 5:
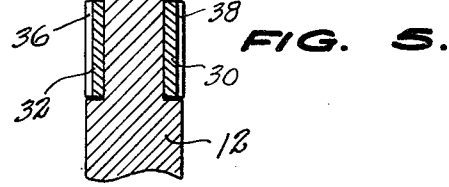

These and other objects and advantages of the present invention will be fully apparent from the following description when taken in connection with the annexed drawing, in which:

Figure 1 is a side elevational view of the fishhook assembly according to the present invention, Figure 2 is a plan view of the assembly shown in Figure 1, Figure 3 is a sectional view on an enlarged scale taken on the line 3—3 of Figure 1, Figure 4 is a fragmentary sectional view taken on the line 4—4 of Figure 3, and Figure 5 is a sectional view taken on the line 5—5 of Figure 3.

Referring in greater detail to the drawing in which like numerals indicate like parts throughout the several views, the fishhook assembly, according to the present invention, comprises a fishhook designated generally by the reference numeral 10 and including a shank having a short straight portion 12 extending inwardly from one end and terminating at a point spaced from that end. The shank includes an elongated substantially straight intermediate portion 14 and a downwardly sloping portion 16 extending from the terminating point of the short straight portion 12 and merging into the intermediate portion 14.

An eye 18 projects from the end of the shank having the short straight portion 12 and is adapted for attachment of a fishing line thereto.

A hook 20 and a barb 22 on one end thereof is carried by the intermediate portion 14 of the shank remote from the sloping portion 16. The hook 20 and the barb 22 face toward and are in longitudinal alignment with the shank short straight portion 12.

A weed guard, designated generally by the reference numeral 24, and embodying a pair of resilient bars 26 and 28 arranged in laterally diverging relation is positioned so that the parts of the bars 26 and 28 adjacent the diverging ends thereof are spaced above and are on the opposite sides of the barb 22 and the parts adjacent the converging ends of the bars 26 and 28 are adjacent the short straight portion 12 of the shank.

A clamp is provided for detachably securing the parts of the bars 26 and 28 adjacent the converging ends of the latter to the shank short straight portion 12. The clamp includes a pair of resilient legs 30 and 32 joined by a flat portion 34 fixedly secured to the converging ends of the bars 26 and 28 and formed integrally therewith.

The short straight portion 12 of the shank is provided with cut-away parts forming recesses on opposed sides of the portion 12 and having flat bottoms, the recesses being designated by the reference numerals 36 and 38 in Figures 3 to 5 inclusive, and receiving therein the adjacent portions of the resilient legs 30 and 32 of the weed guard 24.

The recesses 36 and 38 are joined at their converging ends by a further recess 40, also having a flat bottom, against which abuts the flat portion 34 which connects the legs 30 and 32 together.

The legs 30 and 32 are provided with curved end portions, as at 42 in Figure 3, which embracingly engage the part of the short straight portion 12 exteriorly of the recesses 36, 38 and 40 and on the side of the portion 12 opposite to the recess 40.

In use, the fishhook assembly, according to the present invention, may be provided with a live or artificial bait, as indicated in dotted lines in Figure 1, and designated by the reference numeral 44, and the weed guard 24 may be secured to the shank straight short portion 12 after the bait 44 has been placed upon the hook 20 and the intermediate portion 14 of the shank. This enables the user to employ as large a bait as desired, and permits the securement of such bait to the hook 20 without the necessity of bending the legs or bars of the weed guard 24. The fishhook assembly, with the weed guard 24 attached thereto, may then be cast into a weeded area without danger of the hook 20 or the barb 22 becoming entangled in the weeds. Upon the striking of a fish at the bait 44, the resilient bars 26 and 28 are bent toward the intermediate shank portion 14 to expose the barb 22 and enable the same to be embedded in the throat of a fish. The curved end portions 42 of the legs 30 and 32 permit the ready attachment to and detachment from of the weed guard 24 to the shank straight portion 12, the legs 30 and 32 being resilient to such degree as to spread far enough to receive therebetween the portion 12.

While only a single embodiment of the present invention has been shown and described, other embodiments are contemplated and numerous changes and modifications may be made without departing from the spirit of the invention as set forth in the appended claim.

What is claimed is:

A fishhook assembly comprising a fishhook including a shank having a short straight portion extending inwardly from one end and terminating at a point spaced from said one end, an elongated substantially straight intermediate portion, a downwardly sloping portion extending from said terminating point of said short straight portion and merging into the intermediate portion, an eye projecting from said one end of said shank, and a hook having a barb carried by the intermediate portion of said shank remote from said sloping portion, said hook and barb facing toward and being in longitudinal alignment with said shank short straight portion, a weed guard embodying a pair of resilient bars arranged in lateral diverging relation, said bars being positioned so that the parts adjacent the diverging ends are spaced above and are on opposite sides of said barb and the parts adjacent the converging ends are adjacent said shank short straight portion, said shank short straight portion being formed with opposed recesses, and a clamp including a pair of resilient legs, the parts adjacent the converging ends of said resilient bars being fixedly secured to said clamp with the resilient legs detachably and frictionally engaging in said recesses formed in said shank short straight portion.

References Cited in the file of this patent
UNITED STATES PATENTS

| | | |
|---|---|---|
| 859,144 | Stanley | July 2, 1907 |
| 1,430,626 | Christensen | Oct. 3, 1922 |
| 1,961,378 | Mitchell | June 5, 1934 |
| 2,185,507 | Knapp | Jan. 2, 1940 |
| 2,581,485 | Herkenham | Jan. 8, 1952 |
| 2,615,277 | Hayden | Oct. 28, 1952 |